(12) United States Patent
Phillips et al.

(10) Patent No.: US 11,077,390 B2
(45) Date of Patent: Aug. 3, 2021

(54) SEPARATING DRILLING CUTTINGS AND GAS USING A LIQUID SEAL

(71) Applicant: IRON HORSE TOOLS, LLC, Corpus Christi, TX (US)

(72) Inventors: Joel A. Phillips, Corpus Christi, TX (US); Kevin W. Baker, Luling, TX (US); J. Chris McClanahan, Corpus Christi, TX (US); Raymond H. Jordan, Crosby, TX (US)

(73) Assignee: IRON HORSE TOOLS, INC., Corpus Christi, TX (US)

( * ) Notice: Subject to any disclaimer, the term of this patent is extended or adjusted under 35 U.S.C. 154(b) by 598 days.

(21) Appl. No.: 15/360,945

(22) Filed: Nov. 23, 2016

(65) Prior Publication Data

US 2017/0232365 A1    Aug. 17, 2017

Related U.S. Application Data

(63) Continuation-in-part of application No. 15/222,339, filed on Jul. 28, 2016.
(Continued)

(51) Int. Cl.
*B01D 19/00* (2006.01)
*B01D 21/34* (2006.01)
(Continued)

(52) U.S. Cl.
CPC ..... *B01D 19/0042* (2013.01); *B01D 21/2416* (2013.01); *B01D 21/28* (2013.01);
(Continued)

(58) Field of Classification Search
CPC ................ B01D 19/0042; B01D 21/34; B01D 19/0057; B01D 21/02; B01D 21/2416;
(Continued)

(56) References Cited

U.S. PATENT DOCUMENTS

| 6,340,110 B1 | 1/2002 | Nakamura et al. |
| 8,708,065 B2 | 4/2014 | Largent |

(Continued)

FOREIGN PATENT DOCUMENTS

| CN | 201851049 U | 6/2011 |
| RU | 2081294 C1 | 6/1997 |

(Continued)

OTHER PUBLICATIONS

Heatec, Pump Skids, Jun. 17, 2013, p. 1 (Year: 2013).*
(Continued)

*Primary Examiner* — Bobby Ramdhanie
*Assistant Examiner* — Donovan Bui-Huynh
(74) *Attorney, Agent, or Firm* — John E Boyd; FisherBroyles LLP (57) ABSTRACT

A gas separator, gas separation system, and method for separating gas from drilling cuttings by actively maintaining a liquid seal of liquid in a lower portion of a separation vessel by controlling an introduced amount of the liquid admitted to the separation vessel as a removed amount of the liquid is removed from the separation vessel and by promoting agitation of the drilling cuttings in the liquid in an agitation chamber within the lower portion of the separation vessel to aid removal of the drilling cuttings along with the removed amount of the liquid.

13 Claims, 7 Drawing Sheets

Related U.S. Application Data (60) Provisional application No. 62/259,875, filed on Nov. 25, 2015, provisional application No. 62/199,596, filed on Jul. 31, 2015.

(51) Int. Cl.
*B01D 21/24* (2006.01)
*E21B 21/06* (2006.01)
*B01D 21/28* (2006.01)
*B01D 33/03* (2006.01)

(52) U.S. Cl.
CPC ............ *B01D 21/34* (2013.01); *B01D 33/03* (2013.01); *E21B 21/062* (2013.01); *E21B 21/065* (2013.01); *E21B 21/067* (2013.01)

(58) Field of Classification Search
CPC ...... B01D 221/04; B01D 33/03; B01D 45/12; B01D 17/0208; B01D 19/0063; B01D 21/0006; B01D 21/0021; B01D 21/0033; B01D 21/0042; B01D 21/0045; B01D 21/0048; B01D 21/0087; B01D 21/01; B01D 21/06; B01D 21/08; B01D 21/2405; B01D 21/2427; B01D 21/245; B01D 21/2472; B01D 21/2488; B01D 21/2494; B01D 21/267; B01D 21/28; B01D 21/286; B01D 21/32; B01D 2221/08; B01D 33/41; B01D 33/72; B01D 57/02; E21B 21/065; E21B 21/066; E21B 21/067; E21B 15/00; E21B 15/02; E21B 17/01; E21B 21/062; E21B 21/106; E21B 33/05; E21B 33/06; E21B 41/0057; E21B 43/18; E21B 43/26; E21B 43/34; E21B 43/40; C02F 2103/10; C02F 11/12; C02F 11/14; C02F 1/001; C02F 1/20; C02F 1/38; C02F 1/487; C02F 1/54; C02F 1/74; C02F 2001/007; C02F 2103/365; C02F 2209/40; C02F 2301/066; C02F 2303/04; C02F 2303/06; C02F 2303/22; B08B 9/093; B08B 9/0933; B08B 1/008; B09C 1/02; B63B 27/10; B63B 35/4413; B63B 3/00; C10G 1/00; C10G 1/045

See application file for complete search history.

(56) References Cited

U.S. PATENT DOCUMENTS

| | | | |
|---|---|---|---|
| 2005/0205477 A1* | 9/2005 | Eriksen | B01D 21/0006 210/97 |
| 2010/0307834 A1 | 12/2010 | Largent | |
| 2013/0227997 A1* | 9/2013 | Capeau | B01D 21/02 71/12 |
| 2014/0034447 A1* | 2/2014 | Mathena | C10G 1/045 196/46 |
| 2015/0167413 A1* | 6/2015 | Leuchtenberg | E21B 21/067 166/357 |

FOREIGN PATENT DOCUMENTS

| | | |
|---|---|---|
| RU | 2451924 C2 | 5/2012 |
| RU | 156662 U1 | 11/2015 |
| SU | 1122807 A1 | 11/1984 |

OTHER PUBLICATIONS

Federal Institute of Industrial Property; International Search Report & Written Opinion for PCT/US2016/044655; Nov. 17, 2016; 7 pages; Moscow, RU.

International Preliminary Report on Patentability dated May 29, 2018 in related PCT/US2016/063766.

Federal Institute of Industrial Property; International Search Report & Written Opinion for PCT/US2016/063766; Apr. 13, 2017; 6 pages; Moscow, RU.

* cited by examiner

SEPARATING DRILLING CUTTINGS AND GAS USING A LIQUID SEAL

CROSS-REFERENCE TO RELATED APPLICATION(S)

The present application is a continuation-in-part of U.S. patent application Ser. No. 15/222,339, entitled "SEPARATING DRILLING CUTTINGS AND GAS USING A LIQUID SEAL" filed on Jul. 28, 2016, the entirety of which is herein incorporated by reference, and also claims the benefit of U.S. Provisional Patent Application No. 62/259,875, entitled "SEPARATING DRILLING CUTTINGS AND GAS USING A LIQUID SEAL" filed on Nov. 25, 2015, the entirety of which is herein incorporated by reference.

BACKGROUND

Field of the Disclosure

This invention generally relates to separation of drilling cuttings and gases in air drilling and fluid drilling operations.

Background of the Disclosure

Drill fluid generally includes one or more of hydrocarbons, water, salt, or other chemicals or substances and is widely used in oil and natural gas drilling operations. Drill fluid may provide subsurface pressure that aids in the prevention of underground fluids from entering the borehole, it lubricates and cools the drill bit, and it carries ground up earth including shale (which may be generally referred to herein as drill cuttings solids, or cuttings), in suspension, back to the surface so that it does not interfere with drilling operations. Typically, drill fluid is injected from the surface during the drilling process down through an annular channel within the drill string. The drill fluid then exits the drill string through nozzles or apertures in the drill bit where it thereafter returns to the surface in the area between the drill string and the walls of the borehole, carrying with it the drill cuttings so that they are removed from the borehole.

Mist drilling is air drilling with liquid. The liquid can be water, soap, surfactants, or other chemicals. A water and soap mixture may be added to an air stream at the drilling surface at a controlled rate to improve annular hole cleaning. Many different mediums can be used for mist drilling (water, surfactants, etc.). The annular pressure increases in mist drilling, so the rate of penetration will usually be lower than in dust drilling. In mist drilling, the rate of penetration is often higher than in conventional mud drilling, which often means more cuttings to be disposed of per period of drilling. In mist drilling, drilling can proceed while producing fluids, hole cleaning capacity improves, risk of downhole fires decreases, and no nitrogen is needed.

Various mechanical means have been proposed for separating shale cuttings from gas during drilling operations and for discharging the shale cuttings into a collection pit or hauloff container. Air/mist drilling and fluid drilling operations typically require different dedicated-purpose gas-cuttings separators. Separators also serve to vent gas at a safe distance from the wellbore. Inadequate separation of gas and cuttings can give rise to significant safety risks, including worker exposure to hazardous gases and even flash fires at downstream cuttings collection stations.

Current environmental regulations require that drilling cuttings be collected, dried, and disposed of as stable solids in landfills. Previously, many drilling cuttings were often simply piled up and then spread adjacent the drilling site which caused significant dust during drilling operations and afterwards. Compliance has generally been accomplished by installation of a "dust buster" shale separator that collects and dispenses the cuttings batchwise into a large open bin, e.g., a half-round 40 foot roll-off bin. These cuttings are then typically transferred via backhoe to another bin where a drying/stabilizing additive such as solidification pellets, fibers or ash are mixed in prior to transport of the cuttings mixture to a landfill. The drying/stabilizing additives, waste transport costs, and waste disposal fees represent a significant expense in the drilling operation. The drying/stabilizing agents also significantly increase the volume of the solid waste disposed in landfills from drilling operations.

Accordingly, improvements are sought in enhanced separation of gases, liquids, and cuttings in drilling operations.

SUMMARY OF THE DISCLOSURE

While the way that the present invention addresses the disadvantages of the prior art will be discussed in greater detail below, in general, the present invention provides enhanced separation of gas, liquids and shale cuttings during both air drilling and fluid drilling operations through use of a liquid seal between the respective outflows of gas and cuttings slurries. Separation of cuttings, gases, and fluids is aided by a series of baffles, agitators and liquid level controls as described herein. The liquid seal and other aspects of the present invention allow for use of a single class of separators for both air drilling and fluid drilling operations. The novel devices and methods illustrated and described significantly reduce the amount of dust and mist discharged through the gas outlets of a separation vessel. The novel devices and methods illustrated and described also significantly reduce the amount of liquid associated with the cuttings separated from the gas, liquid, or cuttings slurry.

One aspect of the invention features, in some embodiments, a liquid seal maintained by control of a circulation pump(s) to ensure proper separation of gas and cutting slurry/suspension outflows. The liquid seal provides enhanced gas separation and improved conveyance of cuttings from the separator. This also increases the safety of handling collected cuttings downstream. The novel equipment and method allows for more complete separation of liquid from cuttings and a significantly drier recovery of cuttings. Drier cuttings can result in cost savings and reduced environmental impact from decreased need of materials such as fly ash, wood shavings, or Power Pellets (™ Martlin Distributing www.martlindistributing.com) being used to solidify and manage cuttings and other liquid waste streams generated on a well site.

In some implementations, the liquid seal is provided in a volume above a cuttings agitation chamber. In some implementations, the cuttings agitation chamber includes one or more agitators to prolong suspension of cuttings in a slurry during outflow from the separator. In some implementations, the agitator(s) comprises one or more mixing nozzles supplied with pressurized liquid. In some implementations, the agitator(s) comprises one or more driven mixing members.

In some implementations, the cuttings slurry is discharged from the bottom of the agitation chamber by operation of a pressurized jet in the discharge line creating a low pressure region at the outlet of the agitation chamber.

In some implementations, cuttings are directed into the agitation chamber by a centering baffle configured to centralize cuttings over the agitator and/or cuttings discharge region. In some cases, the centering baffle directs cuttings into a swirling flow of mixing nozzle fluid streams. In some implementations, a drill fluid liquid outlet line is provided though a central region of the centering baffle and agitation chamber. In some cases, the drill fluid liquid outlet line siphons liquids from below the mixing nozzles.

In some implementations, a sprayer and series of baffles reduce escape of fine particulate in the gas outflow and effectively transfer particulate from the upward air flow to the downward liquid flow. In some implementations, the sprayer is configured as a spray bar directed toward the surface of the liquid seal immediately above the inlet of the air cuttings into the separator. In some implementations, baffles adjacent the inlet of the air cuttings serve to direct respective air, liquid, and cuttings flows.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION OF THE DRAWINGS

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, agitation mechanisms, baffles and the like and still fall within the scope of the present invention. It will also be appreciated that it is the intent behind providing examples of multiple embodiments of various aspects of the devices and methods that one aspect of one embodiment can work with other aspects of other embodiments. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The separation systems and methods described herein serve to manage drill cuttings, fluids, and gases during the air/mist drilling and fluid drilling operations. These two drilling methods previously required two separate classes of separator equipment. Implementations of the present invention address both drillings operations with a single design class of separator equipment.

Figure 1:
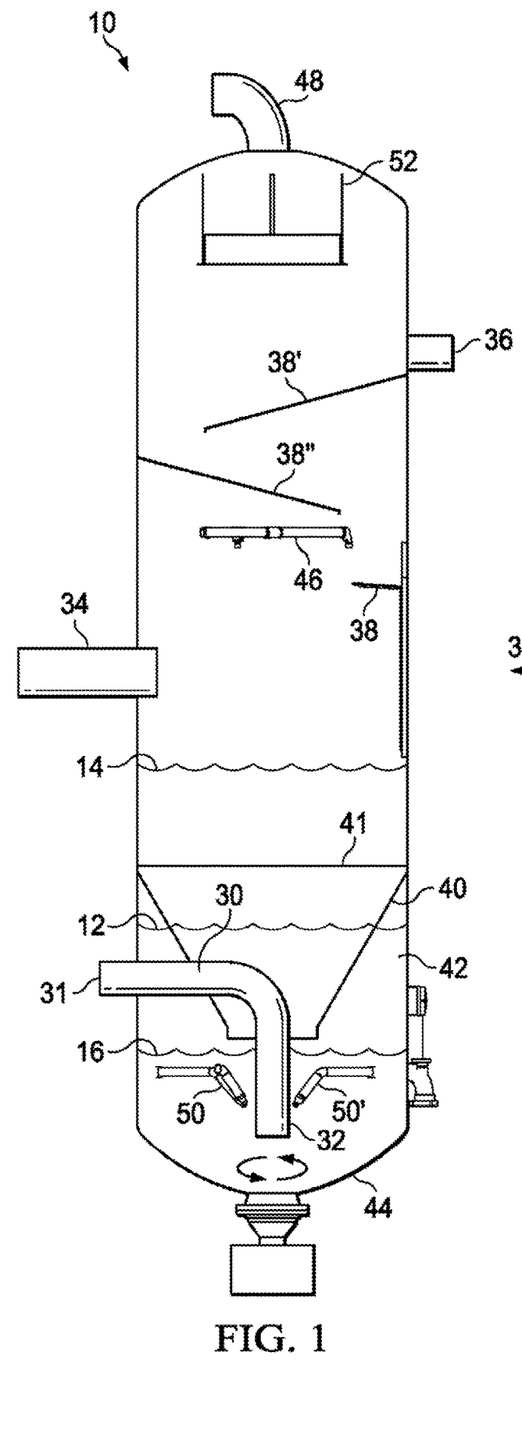
FIG. 1 illustrates a separator for air drilling and fluid drilling operations according to one embodiment having a liquid seal.
Figure 2:
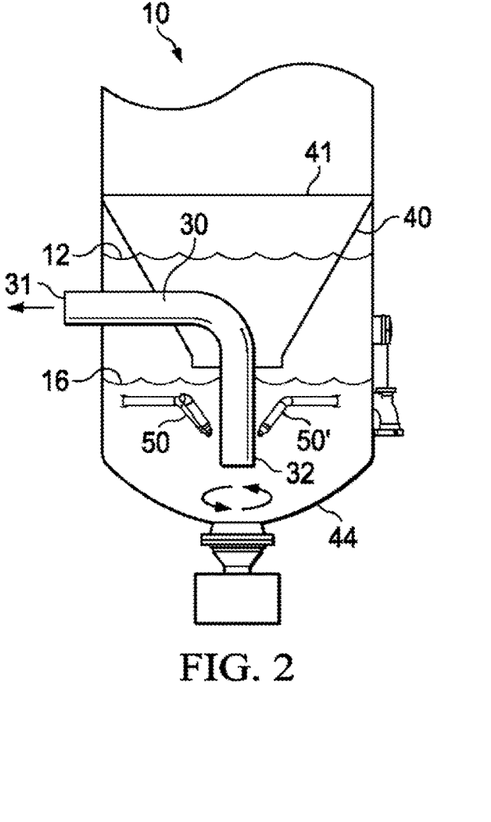
FIG. 2 illustrates a liquid seal and agitation chamber within a separator vessel according to one embodiment.
Figure 3:
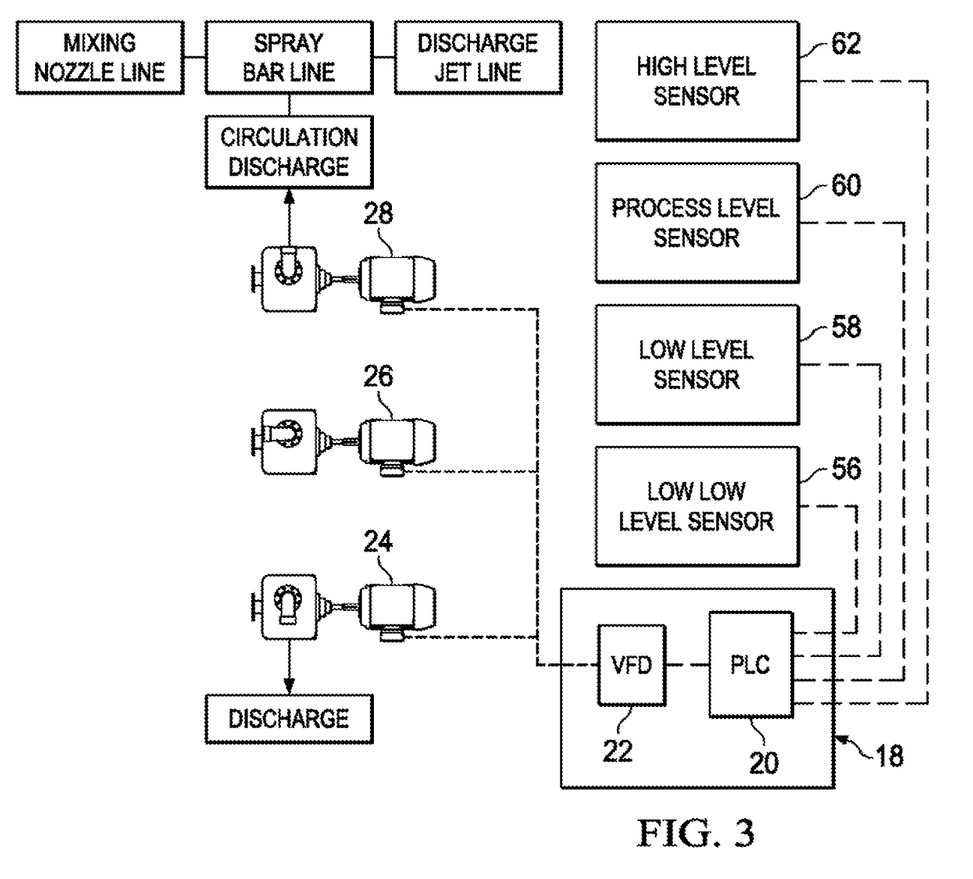
FIG. 3 illustrates a controls diagram for use in maintaining a liquid seal fluid level according to one embodiment.

As illustrated in FIGS. 1, 2, and 3, separator vessel 10 is charged with liquid, typically water to a predetermined level referred to as the process level 12 that is maintained preferably between a high level 14 and a low level 16 by level controls. Level controls may be operated from a control panel 18 and may include programmable logic controllers ("PLC") 20 or variable frequency drives ("VFD") 22, and pumps. Pumps may include discharge pumps 66 driven by discharge pump motors 24, spare pumps 70 driven by spare pump motors 26, and circulation pumps 72 driven by circulation pump motors 28. The liquid seal created in separation vessel 10, in one preferred embodiment, is above cuttings discharge tube 30 having outlet 31 and intake 32. In accordance with at least one embodiment, the liquid seal is toward the bottom of the vessel. Discharge tube 30 drains agitation chamber 42. In some embodiments, this liquid is continually circulated in and out of separator vessel 10 in a closed loop with a discharge pump 66 that also maintains the fluid level of the liquid seal at or near process level 12. Separation vessel 10 may include as an alternative embodiment a chevron 52 to help remove dust or moisture from the air or gases prior to exiting one or more gas outlet 48. By configuring an end of cuttings discharge tube 30 to be located at a lower end of a rising portion of cuttings discharge tube 30, cuttings discharge tube 30 can be configured to serve as a siphon tube, able to siphon liquid from the agitation chamber 42 even if the entirety of the internal portion of cuttings discharge tube 30 located within separation vessel 10 is not immersed in the liquid. In accordance with at least one embodiment, separation vessel 10 can be operated with an internal pressure greater than the ambient external pressure surrounding separation vessel 10. Accordingly, separation vessel 10 can be a separation pressure vessel.

Separator vessel 10 receives air and drill cuttings from a drilling rig through air cuttings inlet 34, and the drilling fluid (mud, gas, slurry) and cuttings through one or more mud, gas, slurry (MGS) inlets 36. As illustrated in FIGS. 1, 2, 4, and 5, during the air/mist drilling process, air and drill cuttings enter in the air cuttings inlet 34, and the solids (e.g., cuttings) are forced downward by baffles 38, 38', and 38" in one preferred embodiment. Fluid and cuttings are also directed by center baffle 40 to the center of separator vessel 10 into an agitation chamber 42, which is defined by the approximate area between the bottom wall 44 of separator vessel 10 and the liquid seal preferably placed at approximately process level 12. The fluid and cuttings are also directed to the center of the bottom discharge outlet by center baffle 40. In this process, air is forced upward, around downward baffles 38, 38', and 38", one or spray bar 46, and out of separation vessel 10 though an air outlet 48. One or more sprayers 46 are placed to wet small solid particulates to prevent them from being carried upward and out of the vessel through air outlet 48. In the embodiment of FIG. 1, sprayer 46 is configured as a spray bar. Sprayer 46 may also add any suitable chemical, e.g., defoamer, surfactant, that may be required or desired.

Figure 6:
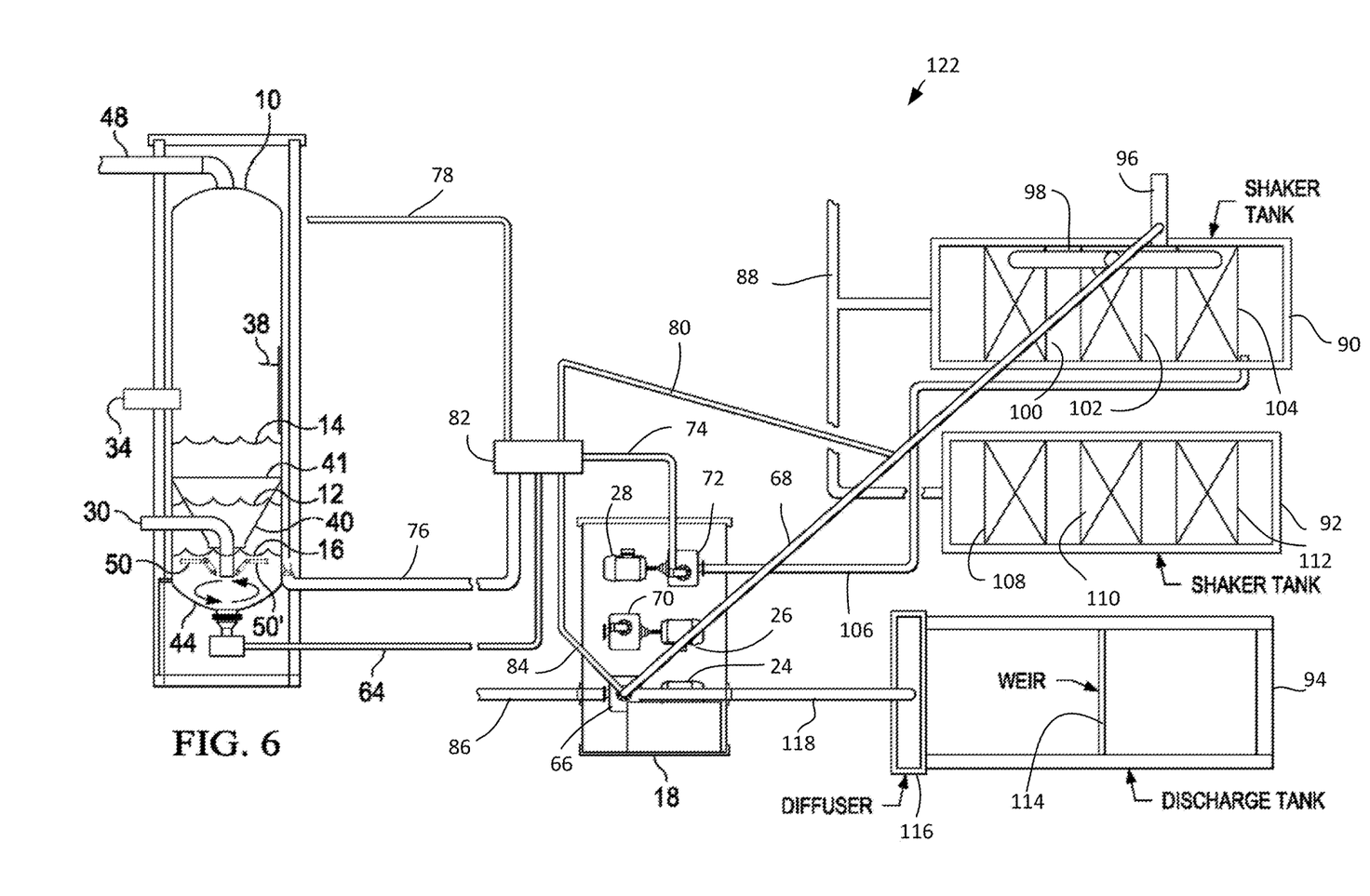
FIG. 6 illustrates an embodiment of the novel separation vessel with liquid seal in an oil and gas drilling operation.

Solids, including wetted particulates, are prevented from settling in the bottom of separation vessel 10 by operation of mixing nozzles 50, 50' that keep solids substantially moving at all times. Wetted particulates fall into the liquid at the bottom of separation vessel 10 and are discharged. In one preferred embodiment, the solids are jetted and pumped out of separation vessel 10 by aid of a jetting nozzle 64 (as illustrated in FIG. 6) charged by discharge pump 66. Solids and liquids are removed from separation vessel 10 by pumping liquid to send the solids and liquids to a diffuser or other equipment (as illustrated in FIG. 6) that spreads the flow evenly in the discharge tank. The fluid is separated from the large solids by means of a weir in the discharge. Liquid is recirculated back into separation vessel 10 through mixing nozzles 50, 50' and sprayer 46; this cycle is typically continuous during operation of separator vessel 10.

With continued reference to FIG. 1, separator vessel 10 includes downward baffles 38, 38', and 38", one or sprayer 46, a gas outlet 48, and agitation chamber 42. Separator vessel 10 creates a liquid seal proximate to process level 12. The liquid seal separates cuttings and gases in both air drilling and fluid drilling operations by controlling inflow and outflow of liquids. In one embodiment, during fluid drilling, the fluid and cuttings enter into separation vessel 10 by MGS inlet 36. Fluid is forced across internal baffle plates 38, 38', and 38". The fluid and cuttings in one preferred embodiment spread across downward baffles 38, 38', and 38" so that entrapped gases can escape and flow up and out of separator vessel 10. The solids and fluid flow down to the bottom of separation vessel 10 and fill the vessel to approximately process level 12 below which is preferably positioned above discard tube 30. The liquids and cuttings are forced into centering baffle 40 and above outlet 31 and inlet 32 of discharge tube 30. The liquid level is maintained as illustrated in FIGS. 1, 2, and 6 at approximately the height of process level 12 (e.g., the level that the liquid seal tube is placed) so as to maintain a downward pressure on outlet 31 of discharge tube 30. The liquid and cutting are forced up into the liquid seal tube and out to the side of the vessel through the fluid and cutting outlet to the shale shakers. Fluids and cuttings can be agitated in separation vessel 10, in one preferred embodiment, by the use of mixing nozzles 50, 50' to which fluid is pumped. One additional purpose of pumping drilling fluid is to form jets of pumped drilling fluid to keep the system from becoming clogged.

With reference now to FIG. 1, a separator for air drilling and fluid drilling operations according to one embodiment of the present invention includes a separator vessel housing a series of baffles, a cuttings agitation chamber, and a liquid seal. The liquid seal allows for separation of cuttings and gases in both air drilling and fluid drilling operation by controlling all inflow and outflow of liquids.

With reference now to FIG. 2, a liquid seal approximately at process level 12 is shown at a level in separation vessel 10 slightly lower than the top rim edge 41 of centering baffle 40 and agitation chamber 42 within the separator according to one embodiment. In this embodiment, agitation chamber 42 includes mixing nozzles 50, 50' configured to agitate cuttings with a swirling action (depicted by counter current arrows) to prevent settling of solids and to enhance flowability of the suspension of solids exiting discharge tube 30 of separator vessel 10. Discharge tube 30 and drill fluid liquid discharge tube outlet 31 are positioned and configured to convey liquid from agitation chamber 42 and to help maintain the fluid level of the liquid seal atop agitation chamber 42 at approximately process level 12. In one preferred embodiment, outlet 31 of discharge tube 30 is above inlet 32 of discharge tube 30 as shown. A liquid seal is maintained by controlling the level of fluid above discharge tube 30.

Figure 4:
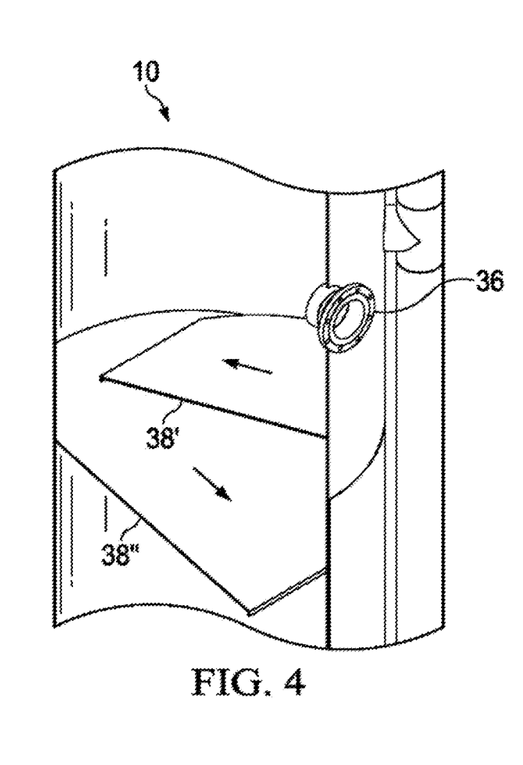
FIG. 4 illustrates a cross-sectional view of a centering baffle according to one embodiment.

With reference now to FIGS. 3 and 4, the liquid seal level, according to one embodiment, is maintained at approximately process level 12 by control of one or more pumps, in particular discharge pumps 66 alone or in conjunction with circulation pumps 72 in response to detection of fluid levels by level sensors including low low level sensor 56, low level sensor 58, process level sensor 60, and high level sensor 62. Other and different sensors may be included to meet the needs of the particular installation. In the illustrated embodiments, variable frequency drive 22 makes discharge pump 66 a variable discharge pump by powering discharge pump motor 24 with a variable frequency power signal. Control panel 18 controls the outflow of fluids bearing solids from the bottom of agitation chamber 42. The speed of one or more variable discharge pump is controlled to maintain the level of the liquid seal atop agitation chamber 42 in accordance with input from desired process level sensor 60, or from high level sensor 62 and low level sensors 56, or 58. Additional sensors can provide greater resolution of liquid levels and greater levels of pump control. Suitable sensors include mechanical sensors, harmonic sensors, or other electronic or mechanical sensors, or switches configured to generate an output signal in response to the presence or absence of a fluid. Fluid level sensors 56, 58, 60, 62 are coupled to a controller 18 for controlling at least a discharge pump motor 24 for operating discharge pump 66. Liquid level sensors 56, 58, 60, 62 can further or alternatively be used to control other pumps, including circulation pump motor 28 for operating circulation pump 72, and to detect operational anomalies and to inform operators by triggering an alert, e.g., an audible or visual warning alert, or to inform upstream and downstream operators and equipment controls.

Turning now to FIGS. 3 and 6, one or more pumps (e.g., circulation pump 72) provides pressurized fluid to the mixing nozzles 50, 50', spray bar 46, and discharge jet 64. In some embodiments, a single circulation pump can serve all three high-pressure fluid delivery mechanisms. One or more additional pumps 70 driving by one or more additional motors 26 can also be provided. Mixing nozzles 50, 50' serve to agitate cuttings in agitation chamber 42 to enhance flow of suspended cuttings. In one preferred embodiment (FIG. 6), discharge jet 64 enters separation vessel 10 from below to help ensure continued flow of solids through discharge tube 30. For example, discharge jet 64 can be positioned in the discharge line leading from agitation chamber 42 to a cuttings collector. A spray bar suspended over the liquid sea and above the cuttings inlet serves to wet particulates borne by the gas as it rises to the gas outlet. Solid cuttings exit agitation chamber 42 to one or more cuttings collectors (represented in FIG. 6 as discharge tanks and shaker tanks). In some embodiments, one or more circulation pump motors 28 operates at a fixed rotational speed and operating pressure while the discharge pump motor 24 operates at variables speeds to maintain the desired liquid seal fluid level. In some cases, the circulation pump motor 28 can also be operated at variable speeds and be controlled in maintaining a desired liquid seal fluid level. Nozzles 50, 50' agitating the swirling of cuttings in agitation chamber 42 can be adjusted for flow rate and swirl pattern.

With reference now to FIGS. 1, 2, 5, and 6, centering baffle 40 is depicted in cross-section according to one embodiment. The centering baffle 40 serves to concentrate and direct the cuttings concentrates and directs cuttings towards the center of agitation chamber 42 for maximum agitation there by mixing nozzles 50, 50'. An upper splash baffle 38" also helps to direct liquids and cuttings downward as they enter separator vessel 10. More than one baffle 38, 38', and 38" can help direct cuttings downward and help prevent the upward movement of cuttings and particulates towards air outlet 48. In alternative embodiments, there may be a plurality of baffles 38, 38', and 38" of a variety of sizes, shapes, and downward angles.

Figure 5:
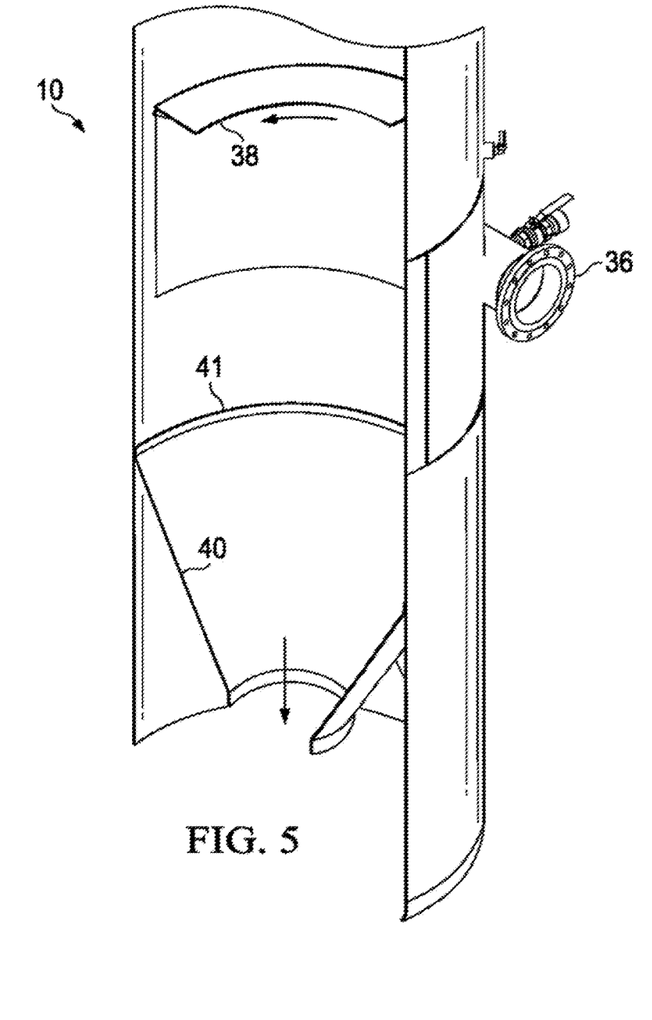
FIG. 5 illustrates a cross-sectional view of baffles within the upper space of the separator vessel.

With reference to FIG. 5, the depicted baffles are used primarily during fluid drilling operations and serve to deflect or direct liquids and solids toward the agitation chamber at the lower end of the separator vessel.

During the operation of separator vessel 10, cuttings, gas, and the drilling air stream or drilling fluid stream enter separator vessel 10. A series of baffles 38, 38', 38" divert solids and liquids downward towards agitation chamber 42 while allowing gas to rise upward towards one or more gas outlet 48. Operation of separation vessel 10 creates an air discharge. A reservoir of liquid, also referred to as a liquid seal, is preferably maintained at approximately the lower end of separator vessel 10 to maximize separation of gases above from solids below. The liquid seal helps insure that the gas and air passing out of one or more gas outlet 48 is cleaned of particulates. The liquid seal also helps insure that the outflow of fluids and cuttings from discharge tube 30 contains significantly less fluid that was previously possible. Agitation of the solids within agitation chamber 42, by mixing nozzles 50, 50' or other means, mechanical, hydraulic, electro-mechanical, passive, or active, helps maintain flowability of solids and helps release entrained gases prior to discharge of cuttings from the separator.

The liquid seal fluid level is created and then is maintained at approximately process level 12 through variation of discharge pump speeds in response to detection of fluid levels by various sensors. Maintenance of the fluid level is further affected by injection of fluid into the system and by one or more discharge pumps 66 and circulation pumps 72 supplying mixing nozzles 50, 50', discharge line jet 64, and sprayers 46. The discharge pump can in one embodiment provide a closed loop recirculation of liquids. Closed loop recirculation reduces water consumption.

The novel liquid seal system and method provides increased safety through reduction of flammable and otherwise hazardous gases that otherwise would accompany discharge of solids from a separator vessel. Drier cuttings can result in cost savings and reduced environmental impact. The system and method of the novel fluid seal in separator vessel 10 disclosed herein also effectively combines and replaces the previously separate mud-gas separator and shale-gas separator required at drilling sites. Combination of these separators into a universal design saves significant time, cost, and footprint during shipping, installation, operation, maintenance, and relocation of separator vessel 10 and related equipment.

With reference to FIGS. 6-12, a separator and shaker system 122 is shown in which drilling cuttings and fluids pass through a separator vessel 10 as described in FIGS. 1-6. A variable discharge pump 66 driven by discharge pump motor 24 is located on the pump skid 152 at the base of the separator 10 and serves to convey separated solids out of the separator. The discharged solids are conveyed through piping to an input manifold associated with several shakers. The piping may include any length of rise or run necessary to convey solids from the separator to the shaker manifold. Jets may be used to help maintain flow of the solids in the lengths of piping and/or at bends or adjacent other flow restrictions. The discharge flow is distributed to the shakers with the solids being agitators by the shakers and the accompanying fluids being drained away through the shaker screens.

For example, discharged solids can travel from separator vessel 10, through discharge tube 30 and discharge return line 86 to variable discharge pump 66. Variable discharge pump 66 can pump the returned fluid with the entrained discharge solids through discharge line 68 to shale shaker manifold inlet 96. Shale shaker manifold inlet 96 provides the incoming fluid with entrained solids to shale shaker manifold 98. Shale shaker manifold 98 provides the incoming fluid with entrained solids to one or more shale shakers 100, 102, and 104 mounted over primary shale shaker tank 90. Solids removed from the fluid by one or more shale shakers 100, 102, and 104 are conveyed from one or more shale shakers 100, 102, and 104 to a corresponding one or more shale shakers 108, 110, and 112 mounted over secondary shale shaker tank 92. Solids removed by the cooperative action of one or more shale shakers 100, 102, and 104 and one or more shale shakers 108, 110, and 112 are conveyed to discharge tank 94. As an example, chutes in the form of diagonally angled plates between one or more shale shakers 100, 102, and 104 and one or more shale shakers 108, 110, and 112 and between one or more shale shakers 108, 110, and 112 and discharge tank 94 can be provided to convey the solids.

A weir 114 is provided in discharge tank 94 to allow recovery of fluid from discharge tank 94 for reuse while leaving behind the solids deposited in discharge tank 94. In accordance with at least one embodiment, weir 114 is located in discharge tank 94 nearer to a diffuser 116 used to draw fluid from an upper portion of discharge tank 94 than any of one or more shale shakers 108, 110, and 112 used to deposit the solids into a lower portion of discharge tank 94. Weir 114 retains the solids in the lower portion of discharge tank 94 away from diffuser 116 while allowing fluid free of solids to flow over weir 114 to be drawn from discharge tank 94 by diffuser 116. Fluid drawn from discharge tank 94 by diffuser 116 flows through discharge tank return line 118 to discharge pump 66. Shale shaker drain line 88 is connected to primary shale shaker tank 90 and to secondary shale shaker tank 92 and provides for communication of fluid between primary shale shaker tank 90 and to secondary shale shaker tank 92. Shale shaker drain line 88 also extends to a drain pipe to allow primary shale shaker tank 90 and to secondary shale shaker tank 92 to be drained, if desired.

Discharge pump 66 can add fluid recovered from discharge tank 94 to the stream of fluid with entrained solids being pumped into discharge line 68 to help maintain suspension of the solids on the fluid stream. Discharge pump 66 can also receive fluid from circulation manifold 82. For example, if an adequate liquid level is present in separator vessel 10 and sufficient fluid is provided by circulation pump 72 for sprayer 46 and other uses, such as feed discharge line jets via discharge line jetting line 80, excess fluid from circulation pump 72 can be diverted by circulation manifold 82 to discharge pump 66 via circulation discharge line 84.

Primary shale shaker tank 90 is connected to circulation return line 106. Circulation return line 106 carries fluid recovered in primary shale shaker tank 90 by the operation of one or more shale shakers 108, 110, and 112 from primary shale shaker tank 90 to circulation pump 72. Circulation pump 72, driven by circulation pump motor 28, under the control of control system 120, pumps the fluid through circulation line 74 to circulation manifold 82. Circulation manifold 82 distributes the fluid as appropriate. For example, circulation manifold 82 can provide a portion of the fluid to discharge line jetting line 80 to be used to provide a fluid jet to be injected into discharge line 68 to help propel fluid with entrained solids through discharge line 68 to shale shaker manifold inlet 96. As another example, circulation manifold 82 can provide a portion the fluid to sprayer 46 via sprayer line 78. As a further example, circulation manifold 82 can provide a portion of the fluid via jetting nozzle line 76 to provide jets of fluid near the inlet of discharge tube 30 to maintain solids in the lower portion of separator vessel 10 in suspension so the solids will be drawn into discharge tube 30 along with a portion of the liquid in the liquid region at the lower portion of separator vessel 10. As a further example, circulation manifold 82 can provide a portion of the fluid via discharge jet line 64 to provide a discharge jet to be emitted from bottom wall 44 of separator vessel 10. The discharge jet can be used to help keep solids in suspension in the liquid in the lower portion of separator vessel 10, to control the level of the liquid in the lower portion of separator vessel 10, or both. As yet another example, circulation manifold 82 can provide a portion of the fluid via circulation discharge line 84 to discharge pump 66. For example, any excess fluid beyond that needed for the other uses described above can be diverted to circulation discharge line 84 to be returned to primary shale shaker tank 90 via discharge line 68 by discharge pump 66.

A spare pump motor 26 and a spare pump 70 can be provided on pump skid 152 to allow easy substitution of spare pump motor 26 and spare pump 70 for a faulty pump motor or pump. Discharge pump motor 24, spare pump motor 26, circulation pump motor 28, discharge pump 66, spare pump 70, and circulation pump 72 can be mounted on pump skid 152 to allow easy reconfiguration of the pump motors and pumps as desired. Control panel 18 can also be mounted on pump skid 152. Control panel 18 can enclose portions of control system 120 used to control the pump motors to operate their respective pumps as desired for proper operation of the components of system 122.

Referring to FIGS. 7-15, separator vessel 10 can be mounted on a structural support, such as frame 142. A gas outlet flange 144 is provided to an end of gas outlet 48 to deliver the gas from separator vessel 10 for further processing. For example, in air/mist drilling applications, the gas can be filtered, compressed, and recycled by being sent downhole again for further removal of cuttings. Examples of the gas for air/mist drilling include gases substantially consisting of air and gases substantially consisting of nitrogen. If sufficient quantities of reservoir gas are included in the gas obtained at gas outlet 48, the gas can be directed, for example, to a flare stack. As another example, in fluid drilling applications, the gas can include reservoir gas, which can be directed, for example, to a flare stack.

Figures 9, 13, 14:
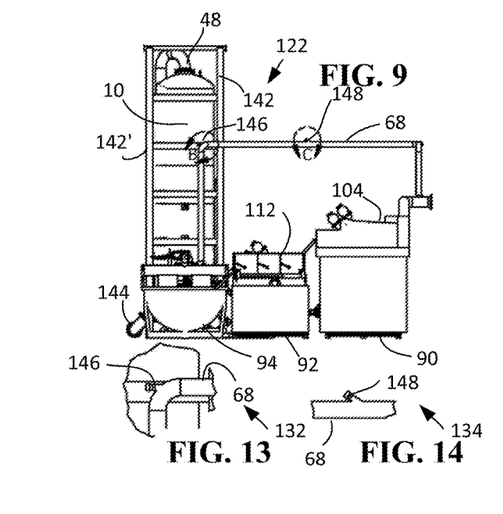
FIG. 9 illustrates a front view of the separator and shaker system of FIG. 7.
FIG. 13 illustrates cuttings discharge tube 30 in accordance with at least one embodiment.
FIG. 14 illustrates cuttings discharge tube 30 in accordance with at least one embodiment.

FIG. 13 provides an inset view 132 illustrating cuttings discharge line 68 in accordance with at least one embodiment. In accordance with at least one embodiment, cuttings discharge line 68 rises substantially vertically from discharge tube 30 and turns a right angle at an elbow to run horizontally toward shale shaker manifold inlet 96. Incorporated into the elbow is discharge line jet fitting 146, which serves to create a jet of fluid oriented out the outlet side of the elbow to help propel the fluid in cuttings discharge line 68 and to maintain suspension in the fluid of any solids traveling with the fluid.

FIG. 14 provides an inset view 134 illustrating cuttings discharge line 68 in accordance with at least one embodiment. In accordance with at least one embodiment, cuttings discharge line 68 runs horizontally toward shale shaker manifold inlet 96 for at least a portion of its path. Incorporated into a straight run portion of cuttings discharge line 68 is discharge line jet fitting 148, which serves to create a jet of fluid oriented through cuttings discharge line 68 in the direction of flow of cuttings discharge line 68 to help propel the fluid in cuttings discharge line 68 and to maintain suspension in the fluid of any solids traveling with the fluid.

Figures 10, 15:
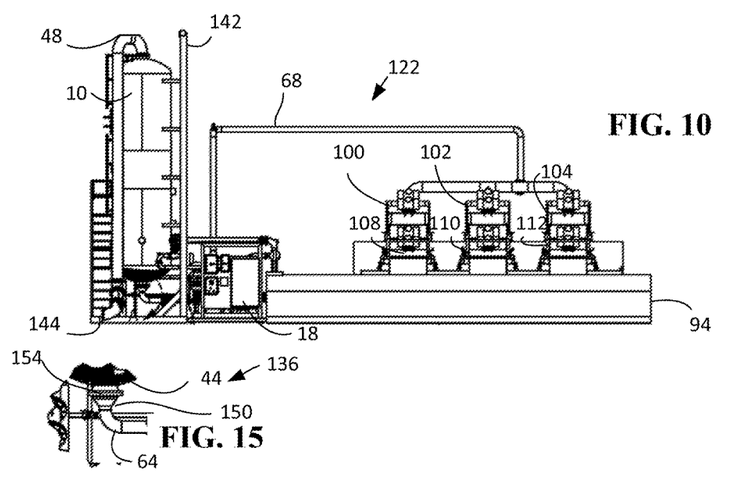
FIG. 10 illustrates a side view of the separator and shaker system of FIG. 7.
FIG. 15 illustrates a bottom port 154 in bottom wall 44 of separator vessel 10.

FIG. 15 provides an inset view 136 illustrating a bottom port 154 in bottom wall 44 of separator vessel 10. Bottom port 154 is defined in the center of bottom wall 44 of separator vessel 10 and provides a port for funnel 150 into separator vessel 10. Funnel 150 is connected to jetting nozzle line 64. In accordance with at least one embodiment, circulation manifold 82 provides at least a portion of fluid provided to it to jetting nozzle line 64, which is plumbed through bottom port 154 to provide fluid to mixing nozzles 50 and 50'. In accordance with at least one embodiment, circulation manifold 82 provides at least a portion of the fluid provided to it to jetting nozzle line 64, which provides fluid upward through funnel 150 and through bottom port 154 to help lift any cuttings or other solids to the vicinity of the inlet of discharge tube 30 to help cause the cuttings or other solids to be drawn into discharge tube 30.

Previous shale separators relied on gravity and operation of a knife valve to convey cutting solids to a catch bin, with subsequent handling generally accomplished using a backhoe. Applicants have discovered that use of discharge pumps and piping to convey air drilling cuttings some distance for further separative processes at a fluid drilling shaker offers numerous advantages. While such shakers have previously only been employed to process cuttings from fluid drilling operations, Applicants have discovered that air drilling cuttings can be sufficiently dried through the shaker process to greatly reduce the need for drying/stabilizing additives.

Combination of the high-efficiency liquid seal separator described with reference to FIGS. 1-15 and fluid drilling shakers in the context of air drilling offers significant cost savings. These savings include greatly reduced need for drying/stabilizing additives, reduced handling costs, reduced waste volume, reduced transport costs, reduced disposal fees and reduced liabilities. For example, experiments demonstrated a 10-20% reduction in total waste volume and waste transport requirements.

Figure 7:
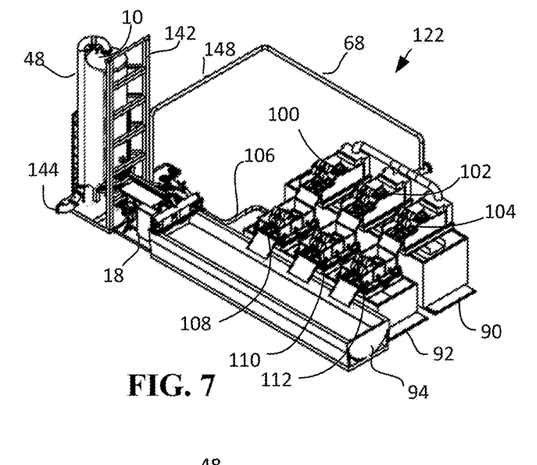
FIG. 7 illustrates a perspective view of a separator and shaker system.

With reference to FIG. 7, liquids can be recovered from the shakers by catch pans and returned to a circulation volume hold-up, e.g., via gravity.

Figure 8:
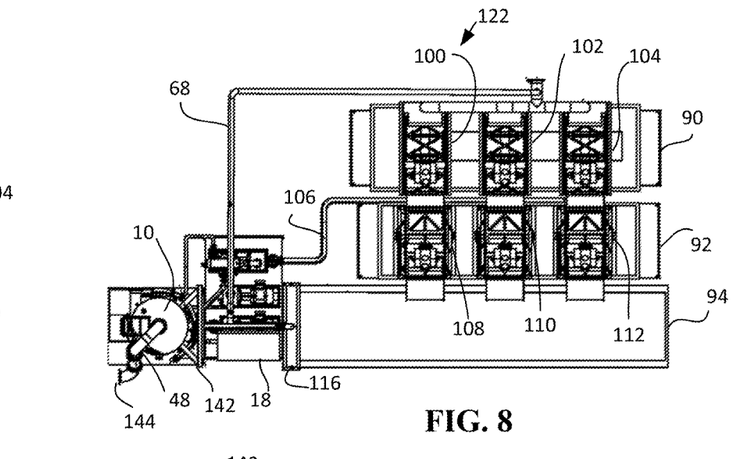
FIG. 8 illustrates a top view of the separator and shaker system of FIG. 7.

With reference to FIG. 8, higher-pressure jets can assist the discharge flow, e.g., at piping bends or along long piping runs.

Figure 11:
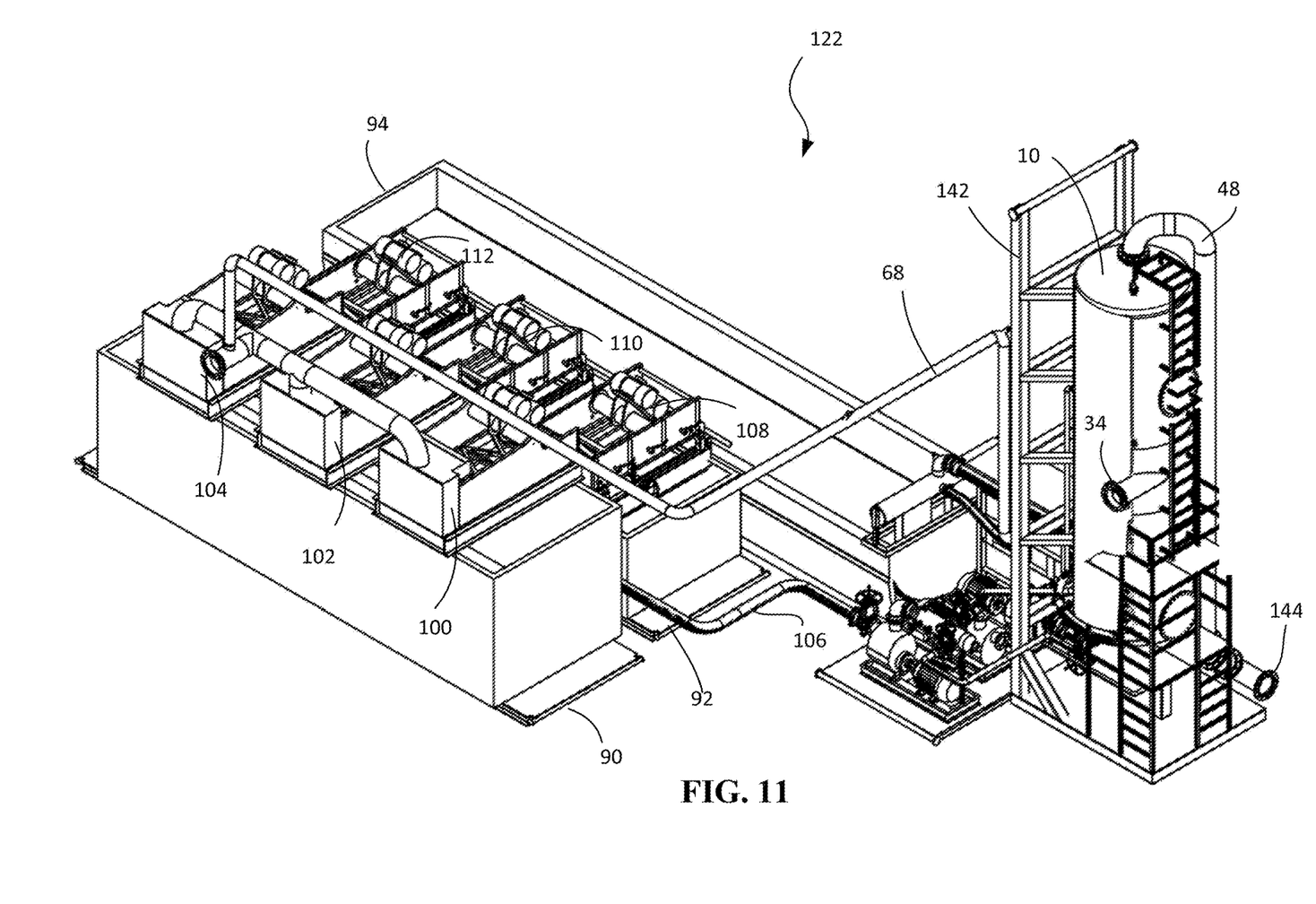
FIG. 11 illustrates a perspective view of the separator and shaker system of FIG. 7.
Figure 12:
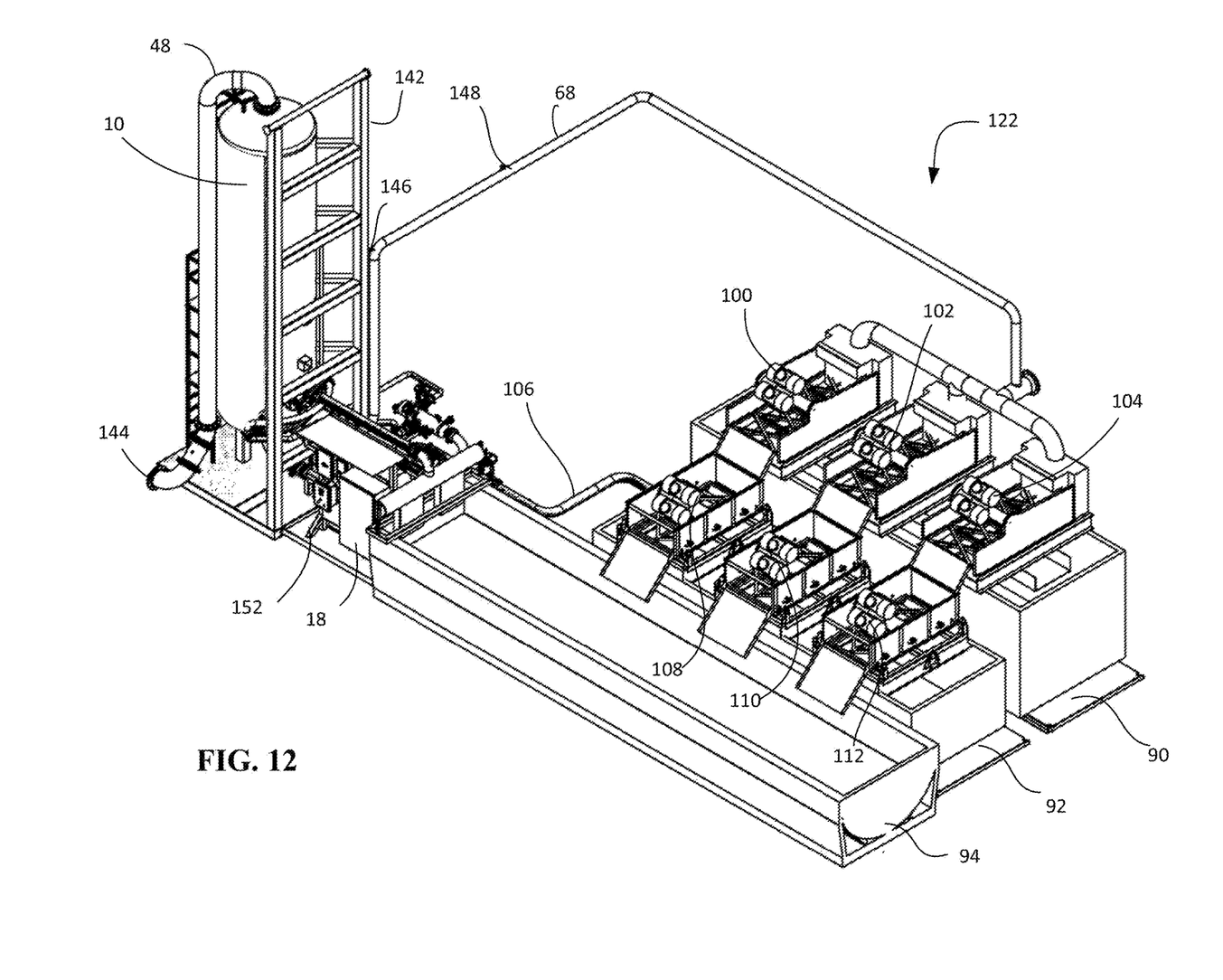
FIG. 12 illustrates another perspective view of the separator and shaker system of FIG. 7.

With reference to FIGS. 10-11, the discharge pump is depicted as conveying separated cuttings solids from the separator output to a manifold at the shakers. Prior art separators merely used gravity and diffusers to allow collected solids to accumulate in the half-round tank. Applicants have discovered significant advantages in discharging these air drilling solids, instead, to the shakers typically reserved for fluid drilling cuttings. Liquids then drain via gravity from the cuttings at the shakers, which liquids are gravity fed back to a circulation tank at the pump skid by the separator. An emergency bypass may be provided to dump separator volume directly into the half-round tank without discharge to the shakers, e.g., in the event of shaker shutdown during drilling.

FIG. 13 illustrates cuttings discharge tube 30 in accordance with at least one embodiment. In accordance with at least one embodiment, cuttings discharge tube 30 comprises a discharge jet fitting 146 to provide a jet of fluid to help ensure continued flow of solids through discharge tube 30.

FIG. 14 illustrates cuttings discharge tube 30 in accordance with at least one embodiment. In accordance with at least one embodiment, a discharge jet fitting 148 is positioned in the discharge line of cuttings discharge tube 30 leading from agitation chamber 42 to a cuttings collector to provide a jet of fluid to help ensure continued flow of solids through discharge tube 30.

FIG. 15 illustrates a bottom port 154 in bottom wall 44 of separator vessel 10. In one preferred embodiment (FIG. 6), discharge jet 64 enters separation vessel 10 from below through the bottom port 154 to help ensure continued flow of solids through discharge tube 30. Alternatively, the bottom port can be used for removal of solids from separation vessel 10.

In accordance with at least one embodiment, at least one of air cuttings inlet 34 and MGS inlet 36 can be centrally directed, directing their respective combinations of air and cuttings or mud, gas, and slurry toward a central axis of separation vessel 10. As an example, the incoming air or fluid can be directed non-circumferentially. As an example, the incoming air or fluid can be directed non-tangentially. As an example, the incoming air or fluid can be directed non-centrifugally. In accordance with at least one embodiment, at least one of air cuttings inlet 34 and MGS inlet 36 can be tangentially directed, directing their respective combinations of air and cuttings or mud, gas, and slurry tangentially along a side wall of separation vessel 10 and imparting a circular component to gas or fluid flow within separation vessel 10. As an example, the incoming air or fluid can be directed circumferentially. As an example, the incoming air or fluid can be directed tangentially. As an example, the incoming air or fluid can be directed centrifugally.

In accordance with at least one embodiment, baffles 38, 38', and 38" can be solid baffles of continuous impermeability. In accordance with at least one embodiment, baffles 38, 38', and 38" can be constructed of material that is non-contiguous, such as perforated material, mesh material, louvered material, or other materials having interrupted surfaces.

In accordance with at least one embodiment, baffles 38, 38', and 38" can be flat baffles having a substantially flat surface. In accordance with at least one embodiment, baffles 38, 38', and 38" can have a textured surface. In accordance with at least one embodiment, baffles 38, 38', and 38" can be corrugated baffles. In accordance with at least one embodiment, baffles 38, 38', and 38" can be diagonally angled baffles. In accordance with at least one embodiment, baffles 38, 38', and 38" can be overlappingly diagonal baffles.

In accordance with at least one embodiment, center baffle 40 can be a concentrically diagonal baffle or combination of diagonally oriented baffles in a concentric configuration. In accordance with at least one embodiment, center baffle 40 can be a frustoconical baffle.

In accordance with at least one embodiment, control system 120 provides dynamic control to actively maintain the liquid level within a predefined range relative to specified locations within separation vessel 10. By maintaining the liquid level within a predefined range with respect to an opening at an end of cuttings discharge tube 30, a liquid seal may be maintained within separation vessel 10. Through the dynamic control of control system 120, the liquid seal may be maintained even as additional fluid is being introduced into separation vessel 10, for example, via sprayer 45 or mixing nozzles 50 and 50', and a portion of the fluid in separation vessel 10 is being removed via cuttings discharge tube 30. Thus, the liquid seal can be maintained even for dynamically changing flow conditions at inlets and outlets of separation vessel 10.

In accordance with at least one embodiment, separation vessel 10 and system 122 are compatible with underbalanced drilling applications, such as air or mist drilling. In accordance with at least one embodiment, separation vessel 10 and system 122 are compatible with overbalanced drilling applications, such as fluid drilling using a drilling mud to create an equivalent circulating density (ECD) greater than a pore pressure of the formation but less than a fracture pressure of the formation. In accordance with at least one embodiment, separation vessel 10 and system 122 are compatible with managed pressure drilling (MPD) applications. Moreover, the liquid seal provided by active control of the liquid level within separation vessel 10 provides dynamic compatibility with changing pressure conditions that may occur during MPD operations.

In accordance with at least one embodiment, separation vessel 10 and system 122 are alternatively configurable for air or mist drilling and for fluid drilling. As one example, air cuttings inlet 34 may be fitted with an air cuttings inlet flange, and MGS inlet 36 may be fitted with a MGS inlet flange. A blind flange of appropriate size may be secured over one or the other of the air cuttings inlet flange and the MGS inlet flange to configure separation vessel 10 for use with the inlet that is not covered by the blind flange. Accordingly, a desired configuration of separation vessel 10 may be determined. Then, separation vessel 10 may be configured for a type of drilling selected from a group consisting of air or mist drilling and fluid drilling. Configuration for air or mist drilling may be achieved by removing any blind flange that may be present over the air cuttings inlet flange and securing a blind flange to the MGS inlet flange. Configuration for fluid drilling may be achieved by removing any blind flange that may be present over the MGS inlet flange and securing a blind flange to the air cuttings inlet flange. In accordance with at least one embodiment, any occlusive member, such as a valve, may be used in place of a blind flange to effect the configurations described above. For temporally alternating applications of air or mist drilling and fluid drilling, the configuration may be changed from a first mode to a second mode, separation vessel 10 may be operated in the second mode, then the configuration may be changed from the second mode to the first mode, and separation vessel 10 may be operated in the first mode. Optionally, continuing alternations of configuration may be performed.

In accordance with at least one embodiment, a method for separating gas from drilling cuttings, the method comprises actively maintaining a liquid seal of liquid in a lower portion of a separation vessel by controlling an introduced amount of the liquid admitted to the separation vessel as a removed amount of the liquid is removed from the separation vessel and promoting agitation of the drilling cuttings in the liquid in an agitation chamber within the lower portion of the separation vessel to aid removal of the drilling cuttings along with the removed amount of the liquid. In accordance with at least one embodiment, the method further comprises providing a tortuous path past a baffle to separate gas from another substance selected from a group consisting of drilling cuttings, the liquid, and foam and providing a gas outlet for removal of the gas from the separation vessel. In accordance with at least one embodiment, the method further comprises applying a fluid spray within a portion of the separation vessel below the baffle and above the liquid seal, the fluid spray for promoting movement of the drilling cuttings downward but allowing the flow of the gas upward. In accordance with at least one embodiment, the promoting the agitation comprises introducing the liquid under pressure via at least one mixing nozzle directed within the agitation chamber. In accordance with at least one embodiment, the actively maintaining the liquid seal comprises maintaining a surface of the liquid above an opening at an end of a discharge tube, wherein the removed amount of the liquid is removed via the discharge tube. In accordance with at least one embodiment, the method further comprises selectively configuring the separation vessel for air or mist drilling by occluding a mud, gas, and slurry (MGS) inlet or for fluid drilling by occluding an air cuttings inlet. In accordance with at least one embodiment, the method further comprises urging the drilling cuttings toward a central axis of the agitation chamber by a frustoconical baffle in the lower portion of the separation vessel.

In accordance with at least one embodiment, a gas separation system for separating gas from drilling cuttings, the gas separation system comprises a separation vessel having a body, the body having a top wall, a bottom wall, a sidewall, the body forming a closed structure defining an interior space of the separation vessel, a discharge pump coupled to the body for promoting the discharge of the drilling cuttings from the separation vessel, a circulation pump coupled to the body for promoting the introduction of a liquid into the separation vessel, and a control system, the control system coupled to the discharge pump and to the circulation pump, the control system for controlling the discharge pump and the circulation pump to actively maintain a liquid seal of the liquid in a lower portion of the separation vessel by controlling an introduced amount of the liquid admitted to the separation vessel as a removed amount of the liquid is removed from the separation vessel. In accordance with at least one embodiment, the separation vessel comprises an agitation chamber in the lower portion of the separation vessel and a mixing nozzle to inject a jet of the liquid into the agitation chamber to promote agitation of the drilling cuttings in the liquid within the agitation chamber to aid removal of the drilling cuttings along with the removed amount of the liquid. In accordance with at least one embodiment, the separation vessel comprises a baffle defining a tortuous path past the baffle to separate the gas from another substance selected from a group consisting of drilling cuttings, the liquid, and foam, and a gas outlet for removal of the gas from the separation vessel. In accordance with at least one embodiment, the separation vessel comprises a sprayer for applying a fluid spray within a portion of the separation vessel below the baffle and above the liquid seal, the fluid spray for promoting movement of the drilling cuttings downward but allowing the flow of the gas upward. In accordance with at least one embodiment, the separation vessel comprises a plurality of liquid level sensors coupled to the control system, the control system for controlling the discharge pump and the circulation pump based on signals received from the plurality of liquid level sensors. In accordance with at least one embodiment, the control system is configured to maintain a surface of the liquid above an opening at an end of a discharge tube, wherein the removed amount of the liquid is removed via the discharge tube. In accordance with at least one embodiment, the separation vessel comprises a frustoconical baffle in the lower portion of the separation vessel, the frustoconical baffle for urging the drilling cuttings toward a central axis of the agitation chamber.

In accordance with at least one embodiment, a separation vessel configurable to be used for air or mist drilling and alternatively configurable to be used for fluid drilling, the separation vessel comprises a body, the body having a top wall, a bottom wall, a sidewall, the body forming a closed structure defining an interior space of the separation vessel, an air cuttings inlet configurable to receive drilling cuttings suspended in a gaseous medium during air or mist drilling, the air cuttings inlet alternatively configurable to be occluded for fluid drilling, and a mud, gas, and slurry (MGS) inlet configurable to receive drilling cuttings suspended in a liquid medium during fluid drilling, the MGS inlet alternatively configurable to be occluded for air or mist drilling. In accordance with at least one embodiment, the separation vessel further comprises an agitation chamber in the lower portion of the separation vessel, and a mixing nozzle to inject a jet of the liquid into the agitation chamber to promote agitation of the drilling cuttings in the liquid within the agitation chamber to aid removal of the drilling cuttings along with the removed amount of the liquid. In accordance with at least one embodiment, the separation vessel further comprises a baffle defining a tortuous path past the baffle to separate the gas from another substance selected from a group consisting of drilling cuttings, the liquid, and foam, and a gas outlet for removal of the gas from the separation vessel. In accordance with at least one embodiment, the separation vessel further comprises a sprayer for applying a fluid spray within a portion of the separation vessel below the baffle and above the liquid seal, the fluid spray for promoting movement of the drilling cuttings downward but allowing the flow of the gas upward. In accordance with at least one embodiment, the separation vessel further comprises a plurality of liquid level sensors configurable to provide signals to a control system, the control system configurable to control a discharge pump and a circulation pump based on the signals received from the plurality of liquid level sensors. In accordance with at least one embodiment, the separation vessel further comprises a frustoconical baffle in the lower portion of the separation vessel, the frustoconical baffle for urging the drilling cuttings toward a central axis of the agitation chamber.

Accordingly, at least one embodiment provides a liquid seal system and method within a separator vessel 10 to accommodate enhanced separation of gases and cuttings in both air drilling and fluid drilling operations. Separator vessel 10, baffles 38, 38', and 38" and other structural components may be constructed of any metal, carbon fiber, composite or other material suitable for the intended operations. Discharge of the solids from both air and fluid drilling operations are provided to shakers traditionally used only for liquid cuttings, greatly improving the drying of air cuttings. Similarly, while the present fluid seal system and method has been described herein for use in air drilling and fluid drilling operations, it may be readily used in any number of other industrial applications and with any number of other drilling equipment or other similar devices now known or hereafter developed.

Finally, while the fluid seal system and method has been described with reference to various exemplary embodiments, many changes, combinations and modifications may be made to the exemplary embodiments without departing from the scope of the accompanying claims. For example, the various components may be implemented in alternative ways and the various embodiments may be used with other embodiments. These alternatives can be suitably selected depending upon the particular application or in consideration of any number of factors associated with the operation of the device. In addition, the techniques described herein may be extended or modified for use with other types of devices. These and other changes or modifications are intended to be included within the scope of this disclosure.

What is claimed is:

1. A gas separation system for processing a drilling fluid to separate gas from drilling cuttings, the gas separation system comprising:
   a separation vessel having a body, the body having a top wall, a bottom wall, a sidewall, an upper portion and a lower portion and the body forming a closed structure defining an interior space of the separation vessel and the lower portion comprising an agitation chamber within the interior space;
   an inlet for receiving the drilling fluid into the interior space of the separation vessel above the agitation chamber, the drilling fluid comprising the gas and the drilling cuttings;
   a gas outlet in the upper portion for discharging gas from the interior space of the separation vessel;
   a discharge pump coupled to a bottom discharge outlet in the lower portion of the body for promoting the discharge of the drilling cuttings from the interior space of the separation vessel;
   a circulation pump coupled to the body for promoting the introduction of a liquid into the interior space of the separation vessel to maintain a liquid seal level within the interior space of the separation vessel;
   one or more sprayers positioned above the agitation chamber and configured to wet articulates borne by the gas with the liquid as the gas rises to the gas outlet after the separation;
   one or more mixing nozzles directed into the lower portion of the interior space of the separation vessel and configured to inject a jet of the liquid to agitate the cuttings with a swirling action within the agitation chamber, wherein the agitation chamber is configured to promote agitation of the drilling cuttings in the liquid within the agitation chamber to aid removal of the drilling cuttings along with a removed amount of the liquid thereby separating the drilling cuttings;
   at least one fluid level sensor configured to detect fluid levels within the interior space of the separation vessel; and
   a control system, the control system coupled to the discharge pump and to the circulation pump, the control system for controlling the discharge pump and the circulation pump to actively maintain the liquid seal of the liquid in a lower portion of the interior space of the separation vessel by controlling an introduced amount of the liquid admitted to the interior space of the separation vessel as the removed amount of the liquid is removed from the interior space of the separation vessel and wherein the at least one fluid level sensor is coupled to the control system.

2. The gas separation system of claim 1 wherein the separation vessel comprises:
   an upper baffle defining a tortuous path past the upper baffle to separate the gas from another substance selected from a group consisting of drilling cuttings, the liquid, and foam; and
   a centering baffle within the interior space and having a top rim edge positioned below the upper baffle and above the agitation chamber and the centering baffle configured to concentrate and direct the drilling fluid towards the center of agitation chamber.

3. The gas separation system of claim 2 wherein the one or more sprayers comprises:
   a sprayer for applying a fluid spray of the liquid within a portion of the interior space of the separation vessel below the upper baffle and above the liquid seal, the fluid spray for promoting movement of the drilling cuttings downward but allowing the flow of the gas upward.

4. The gas separation system of claim 1 wherein the at least one fluid level sensor comprises:
   a plurality of liquid level sensors coupled to the control system, the control system for controlling the discharge pump and the circulation pump based on signals received from the plurality of liquid level sensors.

5. The gas separation system of claim 1 wherein the control system is configured to maintain a surface of the liquid above the agitation chamber and below the one or more sprayers.

6. The gas separation system of claim 1 wherein the separation vessel comprises:
   a frustoconical baffle in the lower portion of the interior space of the separation vessel, the frustoconical baffle for urging the drilling cuttings toward a central axis of the agitation chamber.

7. The gas separation system of claim 1, wherein the one or more mixing nozzles are configured to be adjusted for flow rate and swirl pattern.

8. The gas separation system of claim 1, wherein the at least one fluid level sensor comprises a low low level sensor, low level sensor, process level sensor, and high level sensor.

9. The gas separation system of claim 1, further comprising a pump skid and the discharge pump and the circulation pump are located on the pump skid.

10. A gas separation system for processing a drilling fluid to separate gas from drilling cuttings, the gas separation system comprising:
    a separation vessel having a body, the body having a top wall, a bottom wall, a sidewall, an upper portion and a lower portion and the body forming a closed structure defining an interior space of the separation vessel and the lower portion of the interior space comprising an agitation chamber;
    an inlet for receiving the drilling fluid into the interior space of the separation vessel above the agitation chamber, the drilling fluid comprising the gas and the drilling cuttings;
    a gas outlet in the upper portion for discharging gas from the interior space of the separation vessel;
    a discharge pump coupled to a bottom discharge outlet in the lower portion of the body for promoting the discharge of the drilling cuttings from the interior space of the separation vessel;
    a circulation pump coupled to the lower portion of the body for promoting the introduction of a liquid into the interior space of the separation vessel to maintain a liquid seal level within the interior space of the separation vessel atop the agitation chamber;

one or more sprayers positioned above the agitation chamber and configured to wet particulates borne by the gas with the liquid as the gas rises to the gas outlet after the separation;

one or more mixing nozzles directed into the lower portion of the interior space of the separation vessel and configured to inject a jet of the liquid to agitate the cuttings with a swirling action within the agitation chamber, wherein the agitation chamber is configured to promote agitation of the drilling cuttings in the liquid within the agitation chamber to aid removal of the drilling cuttings along with a removed amount of the liquid thereby separating the drilling cuttings;

at least one fluid level sensor configured to detect fluid levels within the interior space of the separation vessel;

a control system, the control system coupled to the discharge pump and to the circulation pump, the control system for controlling the discharge pump and the circulation pump to actively maintain the liquid seal of the liquid in a lower portion of the interior space of the separation vessel by controlling an introduced amount of the liquid admitted to the interior space of the separation vessel as the removed amount of the liquid is removed from the interior space of the separation vessel and wherein the at least one fluid level sensor are coupled to the control system;

a series of upper baffles defining a tortuous path past the baffles to separate the gas from at least one substance selected from a group consisting of drilling cuttings, the liquid, and foam; and a centering baffle within the interior space and having a top rim edge positioned below the series of upper baffles and above the agitation chamber and wherein the centering baffle is configured to concentrate and direct the drilling fluid towards the center of agitation chamber.

11. The gas separation system of claim 10, wherein the one or more mixing nozzles are configured to be adjusted for flow rate and swirl pattern.

12. The gas separation system of claim 10, wherein the at least one fluid level sensor comprises a low low level sensor, low level sensor, process level sensor, and high level sensor.

13. The gas separation system of claim 10, wherein the one or more sprayers comprises a sprayer for applying a fluid spray of the liquid within a portion of the interior space of the separation vessel below the baffle and above the liquid seal, the fluid spray for promoting movement of the drilling cuttings downward but allowing the flow of the gas upward.

* * * * *